United States Patent
Lohia

(10) Patent No.: US 11,401,635 B2
(45) Date of Patent: Aug. 2, 2022

(54) DEVICE AND A METHOD FOR SENSING BREAKAGE OR END OF WARP YARN FOR A FABRIC WEAVING LOOM

(71) Applicant: Siddharth Lohia, Kanpur (IN)

(72) Inventor: Siddharth Lohia, Kanpur (IN)

(73) Assignee: Siddharth Lohia, Kanpur (IN)

( * ) Notice: Subject to any disclaimer, the term of this patent is extended or adjusted under 35 U.S.C. 154(b) by 242 days.

(21) Appl. No.: 16/635,484

(22) PCT Filed: Aug. 7, 2018

(86) PCT No.: PCT/IB2018/055923
§ 371 (c)(1),
(2) Date: Jan. 30, 2020

(87) PCT Pub. No.: WO2019/038615
PCT Pub. Date: Feb. 28, 2019

(65) Prior Publication Data
US 2020/0370213 A1    Nov. 26, 2020

(30) Foreign Application Priority Data
Aug. 24, 2017 (IN) .............................. 201711026501

(51) Int. Cl.
*D03D 51/30* (2006.01)
*D03D 37/00* (2006.01)
*G01V 9/00* (2006.01)

(52) U.S. Cl.
CPC ............. *D03D 51/30* (2013.01); *D03D 37/00* (2013.01); *G01V 9/00* (2013.01)

(58) Field of Classification Search
CPC ..................................................... D03D 51/30
(Continued)

(56) References Cited

U.S. PATENT DOCUMENTS

| 2,704,557 A * | 3/1955 | Moberg | ................... | D03C 7/00 |
| | | | | 139/50 |
| 3,237,650 A * | 3/1966 | Dickerson | ................ | D03D 1/02 |
| | | | | 139/35 |

(Continued)

FOREIGN PATENT DOCUMENTS

| EP | 2570530 A1 | 3/2013 |
| WO | 2017055961 A1 | 4/2017 |

OTHER PUBLICATIONS

International Search Report and Written Opinion for PCT/IB2018/055923, dated Feb. 28, 2019.

*Primary Examiner* — Khoa D Huynh
*Assistant Examiner* — Grace Huang
(74) *Attorney, Agent, or Firm* — Andrus Intellectual Property Law, LLP

(57) ABSTRACT

A warp breakage/end sensing system and device are configured to detect an end of a warp yarn on a circular weaving machine. A mechanism causes a notification signal to be sent to the loom operator in the situation where a yarn breakage is detected. A drop wire loses its elevation and falls from its normal operative position. The drop causes a first element to rotate and come in contact (physical or non-physical) with a second element, thereby completing an electric circuit and sending a yarn breakage signal to the operator. Upon restoration of the yarn, the first element restores to its normal working position. In the case of a non-physical contact, the first sensing element enters the triggering region of the second sensing element thus causing a signal to be sent.

22 Claims, 6 Drawing Sheets

(58) Field of Classification Search
USPC .......................................................... 139/353
See application file for complete search history.

(56) References Cited

U.S. PATENT DOCUMENTS

| | | | | |
|---|---|---|---|---|
| 3,330,016 | A * | 7/1967 | Smith .................... | D02H 13/00 |
| | | | | 28/187 |
| 4,364,247 | A * | 12/1982 | Muns-Magem ....... | D04B 35/16 |
| | | | | 139/353 |
| 6,814,107 | B2 * | 11/2004 | Schwemmlein ......... | D03C 7/00 |
| | | | | 139/351 |
| 2010/0139804 | A1 * | 6/2010 | Sugiyama .............. | D03D 51/32 |
| | | | | 139/353 |

* cited by examiner

See Figure 3A

DEVICE AND A METHOD FOR SENSING BREAKAGE OR END OF WARP YARN FOR A FABRIC WEAVING LOOM

CROSS REFERENCE TO RELATED APPLICATION

The present application is the U.S. National Stage of International Application PCT/IB2018/055923, filed Aug. 7, 2018, which international application was published on Feb. 28, 2019, as International Publication No. WO 2019/038615. The International Application claims priority to Indian Patent Application No. 201711026501, filed Aug. 24, 2017, the contents of which are incorporated herein by reference in their entireties.

FIELD OF INVENTION

Device of the invention relates to weaving machines, containing warp and weft yarns/tapes for fabric weaving on circular weaving machines, more precisely, sensing of warp yarn/tape breakage/end during fabric production.

BACKGROUND OF INVENTION

The circular weaving loom or machine (CWM) is designed to weave endless tubular or flat fabric using PP, HDPE, LLDPE yarn/tape or other blends of polyolefin (FIG. 1).

The warp yarns/tapes are fed to the weaving machine—from more than one creel via rollers. This ensures uniform warp tension, excellent fabric quality, and trouble-free handling (FIG.-1)

In conventional looms, six or more shuttles running on a reed ring are provided for carrying the weft bobbins. During the fabric production, warp bobbins can be changed easily and quickly without shutting down the CWM. This is done by tying into a knot the two yarns ends—one end being that of the exhausted bobbin and the other being that of the fresh yarn. Therefore, when yarn/tape on a bobbin is coming to end, the bobbin needs replacement with a new bobbin. If this is not done within stipulated time, the warp yarn/tape on the bobbin becomes loose as tension drops due to continuity break. As this is done under observation of the operator, this whole operation is dependent on operator skill and prone to operator error. Furthermore, the loose yarn/tape may possibly entangle with other nearby yarns/tapes coming from adjacent bobbins thereby damaging section of the running fabric. Thus, one of the drawbacks of the existing systems is its requirement to regularly monitor bobbin exhaustion by operator. Similarly, another drawback of the existing systems is that when the ends of the warp are noticed, the machine needs to be stopped immediately such that the ends of the warp tapes are not allowed to reach reed ring section of the weaving machine.

One of the popular methods to sense yarn ends incorporates the use of a drop wire. Drop wire systems consist of a gravity-controlled 'drop wire' made of metals such as stainless steel through which the tape used for fabric making passes. When warp yarn/tape ends or exhausts, yarn/tape loses it tension which causes it to slag causing drop wire to fall down. In this case, operator observes slag in yarn/tape and stops the machine to change the empty or semi filled tube with new bobbin.

There are certain limitations of this system which are of practical significance. First, in running machine operator would require to keep monitoring for any warp end, which is very difficult when number of machines operated by operator is more than one or operator loses his attention in between. Second, when number of warp bobbins getting empty is higher, in that case observing all of them is difficult, meanwhile running machine produces waste fabric which cannot be used further.

Nowadays, there is growing trend of filler addition to polyolefin tapes. The filler content tends to generate powdery dust particulates during fabric weaving operation. These dust particles settle on any available surface in the vicinity of the loom. The settled dust has the potential to disrupt the electronic/electrical sensor functioning, hampering the loom operations. There are yarn end detection systems that are automated and use electric circuits (U.S. Pat. No. 2,609,011, for example). However, it has been found that these systems are susceptible to frequent malfunctioning, especially in the dusty environs.

Another prior art which can be referred in same context is EP 2570530.

Another improved method for warp tapes end sensing has been already detailed in international application number PCT/IB2016/055570. It describes special geometry of sensing element and drop wire which solves problem of warp end sensing in normal as well as in dusty environmental condition. This prior art also eliminates earlier drawbacks of false triggering by developing operation algorithm such that, and no signal problem in case of accumulated thick dust paste on sensing element.

Above mentioned prior art has drawback of designing complex sensing element, which requires development of special tools. In addition to this, prior art parts need to come in contact to generate signal of warp end, which can be failed under condition of wear and tear or any physical blockage in movement of drop wire. There is, therefore, a need arises to provide an improved drop wire and a system to detect yarn end and provide a notification of it to the operator, which can work without interruption in any environmental condition and position of drop wire with respect to sensing plate in case of warp tape end.

OBJECTS OF INVENTION

Accordingly, one of the objects of the present invention is to provide an automated system for sensing warp end.

Another object of the invention is to provide an automated system for detecting warp end which will work robustly in any environmental condition.

A further object of the invention is to provide an improved generic system with easy manufacturability of elements.

Another object of the present invention is to provide a system that reduces the wastage of weaved fabric and machine downtime.

LIST OF PARTS

| | |
|---|---|
| Creel Bracket (1) | First element (7) |
| Yarn (1A) | Supporting hinge or Pin (7A) |
| Inlet Motor (2) | Bracket (7B) |
| Roller (3) | First sensing element (7C) |
| Woven fabric (4) | Extension arm (7D) |
| Bobbin (5) | Hole (8B) |
| Drop wire (6) | Second element (8) |
| Loop (6A) | Second sensing element (8A) |
| Motion restrictor element (6B) | Cavity/opening (7E) |
| Outer surface of motion restrictor element (6C) | |

SUMMARY OF INVENTION

The invention is an improved warp breakage/end sensing system and a device to detect end of a running yarn on a CWM used to make endless tubular fabric. The device of the invention incorporates a mechanism which causes a notification in the form of a signal (indicating yarn breakage or yarn end) to be sent to the loom operator in the situation where a yarn breakage is detected—or in the event of a yarn package running out of yarn, a yarn end. Notification signal may be in any form. It may be electrical, optical, audio or an electronic signal including notification using a software or an app. The invention is particularly suitable for any kind of dusty environment in which CWMs typically operate.

Figure 1:
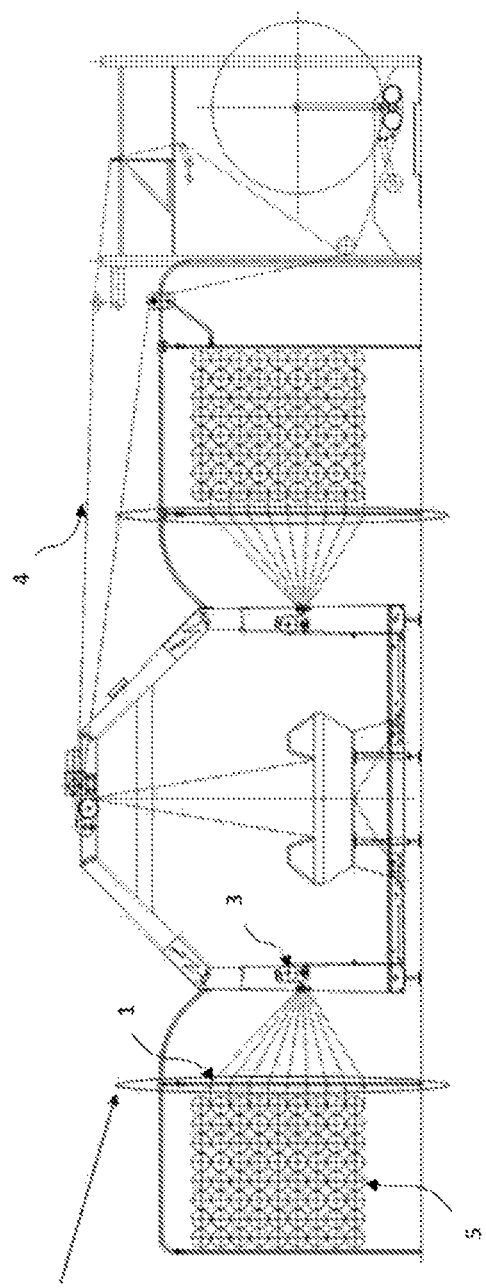
FIG. 1 shows a schematic of loom used to manufacture woven fabric & location of warp end sensing system.
Figure 2A:
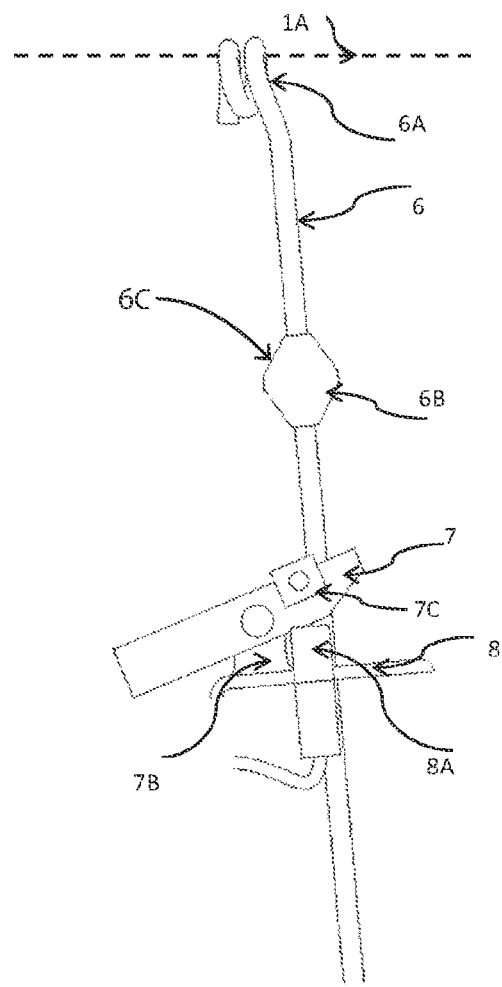
FIG. 2A shows in the side view, the position of sensing elements in the normal working condition of the CWM.
Figure 3A:
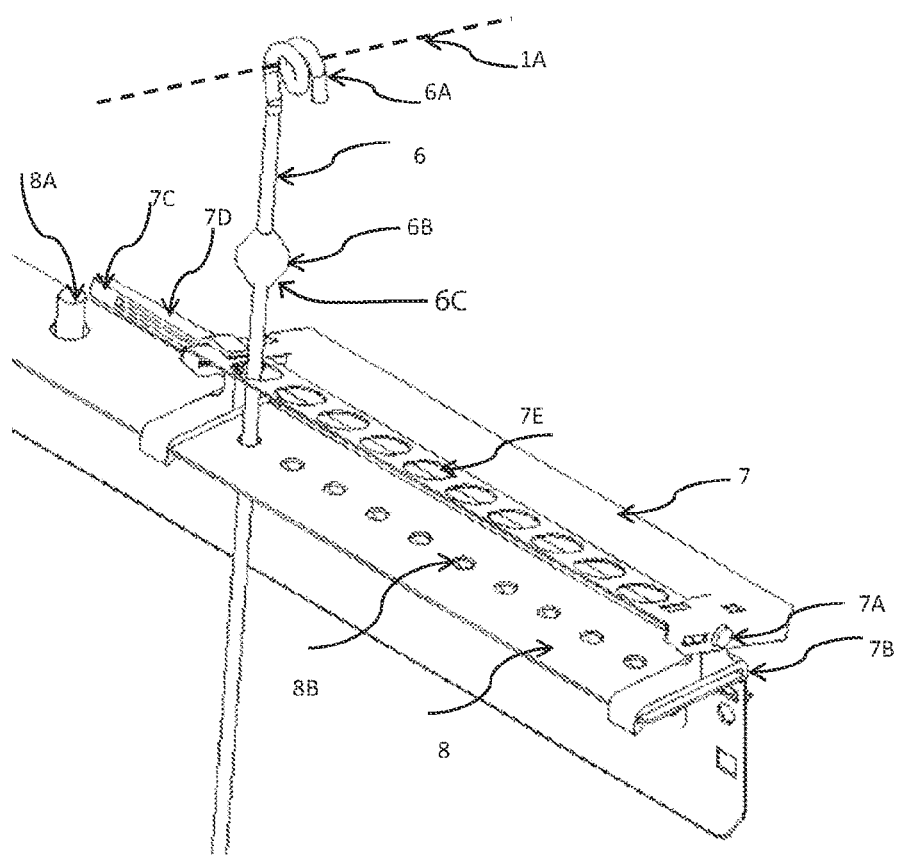
FIG. 3A shows in a perspective view, the position of sensing elements in the normal working condition of the CWM.
Figure 3B:
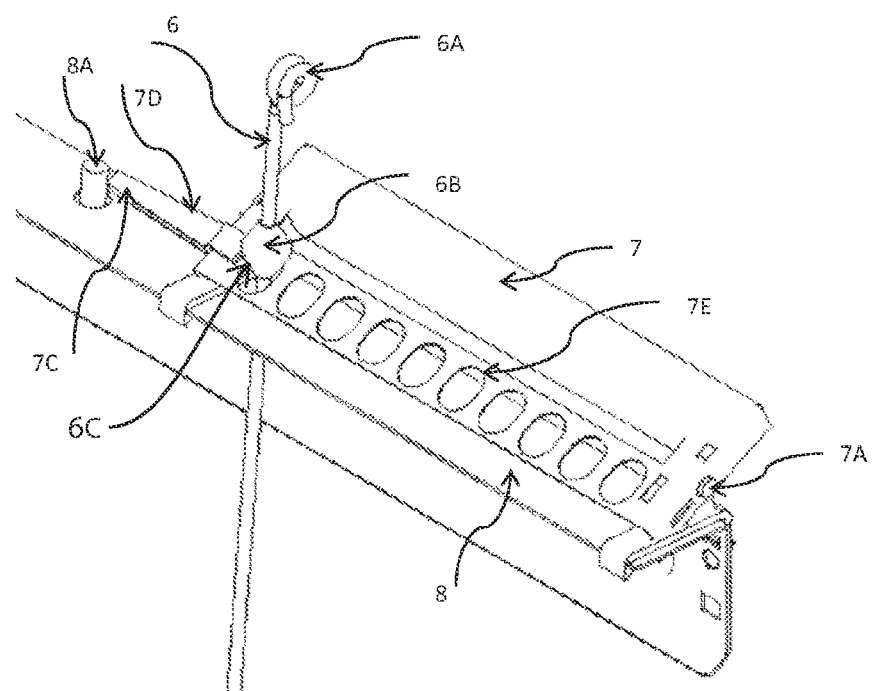
FIG. 3B shows in a perspective view, the position of sensing elements in during a yarn-end-detection event.

The device of the invention is illustrated in FIGS. 2A and 3A. It employs a drop wire (6) which maintains its normal operating position by hanging during running of yarn/tape that passes through a loop (6A) provided at one end of the drop wire (6). Drop wires (6) are provided on every individual warp yarn/tape which is fed to the central reed ring section. Breakage of the running yarn (1A) causes loss of tension in the yarn (1A), causing the drop wire (6) to lose its elevation rapidly and fall (under its self-weight) from its normal operative position. As shown in FIG. 2A, the drop wire is provided with a motion restrictor element (6B). The purpose of the motion restrictor element (6B) is to halt the downward motion of the drop wire (6) when it comes across a cavity/opening (7E) provided in the first element (7), which halts the further downward motion of the drop wire (6).

As can be seen from FIGS. 2A and 3A, the first element (7) is rotatable at its ends using a rotational mechanism. One type of rotational mechanism is a pin (7A). One such pin (7A) is provided at each end of a bracket (7B) that is in turn supported by a second element (8). Another type of rotational mechanism may be a ball bearing. In an embodiment, the bracket (7B) may be supported by any other structural member that may be attached to the CWM at a suitable position. In another embodiment, a bracket may be replaced by any other structural member that is capable of supporting the rotational mechanism along with the first element.

In its normal operative condition, the first element (7) may be positioned horizontally or at any inclined position in which it may remain stable. On the first element is mounted a first sensing element (7C). A second element (8) is provided on which is mounted a second sensing element (8A). The first and second sensing elements are parts of an electric circuit (not shown) that remains open during the normal operation of the device. When the drop wire falls, it causes the first element (7) change its orientation which in turn pushes the first sensing element (7C) such that it comes in contact with second sensing element (8A).

The term contact is meant to mean either a physical contact or a non-physical contact. In the case of a physical contact, the electric circuit (not shown) is completed which leads to an electric signal being sent to the loom operator. In the case of a non-physical contact, the first sensing element enters the triggering region of the second sensing element whereafter the signal to the loom operator is sent by the second sensing element (a proximity sensor) when it detects the first sensing element (a proximity object or a target).

As described below, contact between the two sensing elements may be physical contact or non-physical contact. In the case of physical contact type between the two sensing elements (7C and 8A), state of an electric circuit changes with establishment of physical contact between the two sensing elements (7C and 8A)—i.e. it goes from being open to being closed. The non-physical type contact between the two sensing elements (7C and 8A) may be established on the principles of optics, magnetism or electric field. A person skilled in the art would readily know how to incorporate an electric circuit for this purpose.

DETAILED DESCRIPTION OF THE INVENTION

Woven fabric used for making bags for storing materials such as grains, cement, etc. is made from yarn/tape of PP, HDPE, LLDPE or other blends of polyolefin. The looms that make tubular fabric for making such bags deploy number of bobbins. As discussed earlier, for number of reasons, yarn gets broken during the loom operation. The device disclosed in the invention allows detection of a broken yarn/tape or their end so that the loom may be stopped in order and a signal is generated for operator on duty to avoid entanglement of the broken yarn/tape with other yarns/tapes operational on the loom.

As disclosed in the summary section, the key purpose of the device of the invention is to detect the breakage or end of a running yarn (1A) and inform the loom operator of its occurrence. This is achieved by providing the following three key elements in the device: a means to detect the yarn breakage, an electric circuit, and a notification means.

It also should be noted that the weaving looms operate in an environment where a substantial amount of particulate matter (dust) is generated because of loom operation. These particles settle on any available surface near the loom. The settled dust which is electrically non-conductive has the potential to hamper the loom operations. In the case of systems to detect ends of the yarn (1A), where electric circuits are employed, the smooth working of such circuits may be hampered by such dust. One of the key aspects of the device of the invention is that it works effectively regardless of the dusty environments within which they are deployed.

The device of the invention is illustrated in FIGS. 2A and 3A. It is a device for sensing end of warp yarn (1A) or tapes on an automated fabric weaving loom and notifying the instance of yarn breakage to the operator. It comprises a yarn end detection means to detect the breakage of or a slack in running yarn, an electric circuit, and a notification means to notify breakage of or slack in yarn.

In one aspect of the invention, the yarn end detection means comprises a drop wire (6) with an eye or a loop (6A) at its one end through which the running warp yarn/tape (1A) passes, and which is held in substantially upheld position by the tension in the running yarn. One key aspect of the invention is it provides a unique system for sending a signal when a circuit (not shown) is closed. The working of the system is unaffected by the dusty environment within which the CWMs typically operate.

Figure 2B:
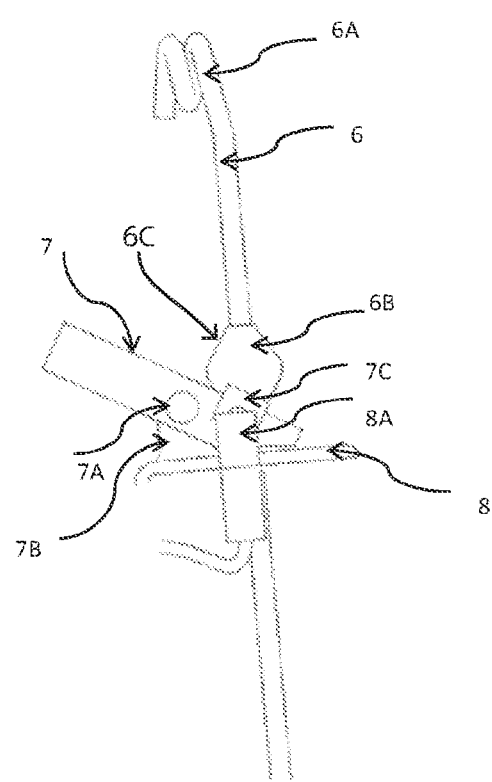
FIG. 2B shows in the side view, the position of sensing elements in during a yarn-end-detection event.

The drop wire (6) maintains its normal operating position by hanging from the running of yarn/tape (1A) that passes through the loop (6A). Breakage of the running yarn (1A) causes loss of tension in the yarn (1A), causing the drop wire (6) to lose its elevation rapidly and fall (under its self-weight) from its normal operative position. As shown in FIG. 2, the drop wire is provided with a motion restrictor element (6B). The purpose of the motion restrictor element (6B) is to enable halt of the downward motion of the drop wire (6) when it comes across a cavity/opening (7E) provided in the first element (7), which halts the further downward motion of the drop wire (6).

As can be seen from FIGS. 2A and 3A, the first element (7) is rotatable at its ends using a rotational mechanism. One type of rotational mechanism is a pin (7A). One such pin (7A) is provided at each end of a bracket (7B) that is in turn supported by a second element (8). Another type of rotational mechanism may be a ball bearing. In an embodiment, the bracket (7B) may be supported by any other structural member that may be attached to the CWM at a suitable position. In another embodiment, a bracket may be replaced by any other structural member that is capable of supporting the rotational mechanism along with the first element.

In its normal operative condition, the first element (7) may be positioned horizontally or at any inclined position in which it may remain stable.

A first sensing element (7C) is securely attached to the first element (7) at its one longitudinal end. In one embodiment, an extension arm (7D) is provided to the first sensing element (7C). A second sensing element (8A) is provided on the second element (8).

The first and second sensing elements (7C and 8A) are of a type that allows establishment of a contact between themselves, which may be of physical or non-physical type. A physical contact allows closure of an electric circuit (not shown) and, upon determining that the physical contact remains in place for longer than a predetermined period, ultimately sending of a signal to the loom operator or an electronic controller that controls the running of the CWM. To close electric circuit, both first and second sensing elements (7C and 8A) are made of electrically conducting materials, for example, metals.

The preferred embodiment discloses a non-physical contact, where the first sensing element enters the triggering region of the second sensing element whereafter the signal to the loom operator is sent by the second sensing element (a proximity sensor) when it detects the first sensing element (a proximity object or a target).

Figure 4A:
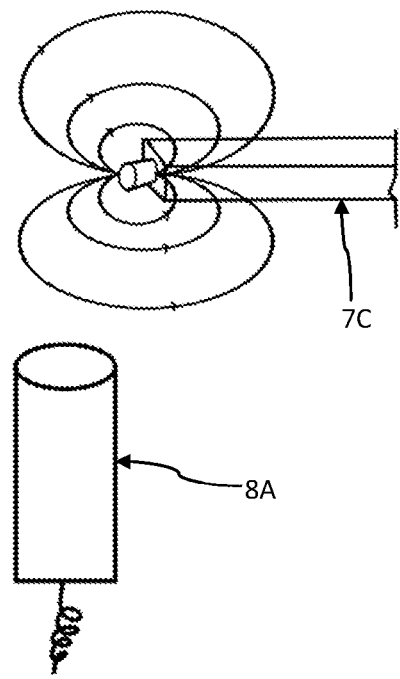
FIGS. 4A and 4B show the working of sensing elements of electro-magnetic type.
Figure 4B:
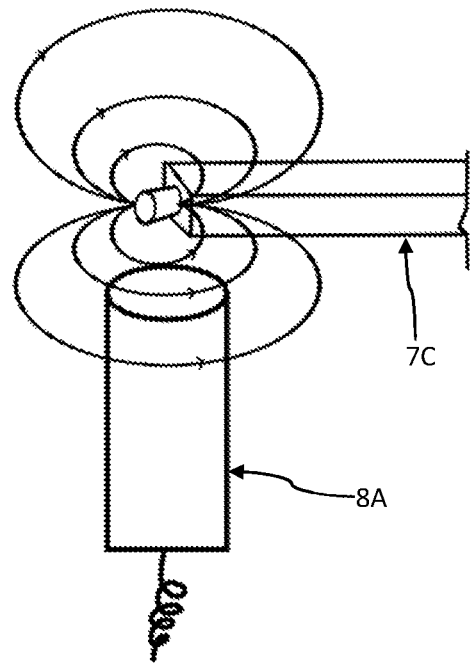

In the case of closing electric circuit through a non-contact sensing system, any one of the first and second sensing elements (7C and 8A) may be a proximity sensor and the other a proximity object or target detectable by the proximity sensor. A proximity sensor may of electric, electromagnetic (refer to FIGS. 4A and 4B), or optical type. More generally, proximity sensors are of a type selected from a group of types comprising capacitive, capacitive-displacement, Eddy-current, inductive, magnetic, photoelectric, ultrasonic, Hall effect. A person skilled in the art would readily know how to construct an electric circuit using any of these types of sensors.

One key advantage of using non-contact type sensors is that they work regardless of the dusty environment in which a typical CWM operates.

It is important to note the importance of allowing the contact to be maintained for the predetermined period before sending the yarn breakage signal. It ensures that there is indeed a yarn breakage or yarn end. If there is a temporary malfunction in the running of yarn, it could correct itself within the said predetermined period, and the CWM may continue to function normally. In this case, there is no need to allow the system to shut down the CWM.

In the event of a yarn breakage, as soon as the drop wire (6) drops and comes to a halt, when its motion restrictor element (6B) is obstructed by the first element (7), the first element (7) swivels/rotates about a rotational mechanism provided at the ends of said first element (7) such that the first sensing system element (7C) comes in contact with the second sensing system element (8A), thereby completing the circuit (not shown) and sending a signal to the loom operator (or an electronic controller) that controls the running of the CWM.

The rotational mechanism may be a pin that is supported by a bracket (7B), for example.

The first and second sensing elements (7C and 8A) may be in any form or shape that allows easy and stable electric connection with each other in the case when they work on the principle of physical contact. The first and second sensing system elements (7C and 8A) are designed so that there's sufficient contact area between them so that a stable electric contact establishes. This must be done in consideration that the contact surfaces of the two sensing elements (7C and 8A), that come in electric contact with each other, may be partially covered in particulate matter generated by the operation of CWMs.

In its simplest form, the first sensing element (7C) may be a plate, preferably planar or flat, made from a conducting element such as a metal. In one embodiment, to enable convenient positioning of the second sensing element (8A), the first sensing element (7C) may be provided on an extended arm (7D) at the end of which a flat plate made from a conducting element (serving as a first sensing element (7C)) such as a metal may be provided.

The motion restrictor element (6B) of the drop wire (6) has a shape or profile or form that allows the downward motion of the drop wire (6) to come to a halt by the first element (7) when the motion restrictor element (6B) comes across the cavity/opening (7E) provided in the first element (7). In one embodiment the motion restrictor element (6B) is in the form of a bulbous element, for example an ovoid, and having outer surface (6C) and which is attached to the drop wire at a predetermined distance 'h' from the eye (6A). In another embodiment, the motion restrictor element (6B) is in the form of a kink or a bend provided in the body of the drop wire (6). The second element (8) typically has a hole (8B) through which the drop wire (6) passes when it's hanging in its normal operative position. The bend or the kink in the drop wire (6) is of a size or shape that makes the bent or kinked portion of the drop wire impassable through the hole. The hole (8B) and the cavity/opening (7E) are aligned so that the drop wire passed through them both.

During the operation of the loom, if a yarn (1A) breaks, the specific drop wire (6) that was supported by the yarn (1A), before its breaking, drops from its previously upheld normal operating position. It should be noted that during the normal operations of a loom, the drop wire (6) moves up and down vertically, in small amounts, from its normal operating position. This is due to irregularity in the package's winding quality, leading to variation in the yarn tension. However, such variation in the vertical positional is normal and not unexpected. Whenever there's such accepted type of positional variation, the drop wire (6) regains its normal working position in a matter of fraction of seconds.

In the instance of an actual breakage of the yarn (or indeed when a package comes to an end, thereby running out of yarn), the drop of the drop wire (6) from its normal operating position is substantial and irrecoverable. It is the purpose of this invention to be able to detect such substantial and irrecoverable drops and not hamper the working of a CWM in the case there's an acceptable level of drop. The drop wire (6) drops vertically by a substantial distance from its normal operating position on substantial loss of tension in the running yarn (1A). The irrecoverable drop of the drop wire (6) represents a yarn-end/breakage detection. Upon detection of yarn-end/breakage, the specific drop wire (6)—through which the specific unbroken yarn (1A) used to pass—drops till its motion is halted by the motion restrictor element (6B) that gets obstructed by the cavity/opening (7E) provided in the first element (7). At this point, the weight of the drop wire (6) bears down upon the first element (7). The first element (7) thus rotates around the pin (7A) relative to its normal operating position. Consequently, the first sensing element (7C) moves and makes an electrical contact with the second sensing element (8A) either in a physical or non-physical manner.

Similarly, restoring the drop wire (6) to its normal operating position will allow the electric circuit to become open again, thus facilitating the working of the CWM once again. For restoring the normal working position of the first element (7), following a yarn breakage event, a spring or a counterweight mechanism is provided to the first element.

During normal working operation of the loom, the electric circuit remains 'open' because the two sensing elements (7C and 8A) are spaced far apart so that they do not allow establishment of an electric contact. The device of the invention is so designed that upon yarn breakage or a yarn end, the first sensing element (7C) establishes an electric contact (either physical type or non-physical type) with the second sensing element (8A) when the two either touch physically or when it reaches in close proximity of the second sensing element (8A) whereby the electric circuit gets completed effectively regardless of the presence of dust or any kind of obstacle between two sensing system elements (7C and 8A). Upon closure of the electric circuit, an alarm is raised and a signal is sent to the machine operator indicating the yarn breakage.

In another preferable embodiment, the first element (7) is made of any material that allows it to function. The spring or counterweights are calibrated such that in normal operational condition, fixed angular position of first element (7) with respect to horizontal plane is maintained in such a way that first sensing element (7C) mounted on it does not allow closing of the electric circuit. As mentioned earlier, counterweights can be made of any material and can be made removable or fixed on first element (7). Furthermore, the motion restrictor element (6B) may be made of an electrically conducting or non-conducting type material.

As explained earlier, the outer surface (6C) of the motion restrictor element (6B) may be of any shape, however it should be such that when the drop wire (6) drops from its normal working position, it falls into and gets obstructed by the cavity (8B) provided on the first element (7). The outer surface (6C) should be also of such shape that, upon resumption of the tension in the yarn (1A), the drop wire (6) is pulled up back in an unhindered manner to its own normal working position due to the tension in the yarn (1A).

The vertical distance at which the motion restrictor element (6B) is located from the first element (7) depends on the overall configuration of the CWM system. The distance should be such that upon yarn breakage detection, the circuit is closed within a reasonably short period of time. The distance should also be such that there is no false alarm raised in situations where there is temporary loss of tension. However, there may be exceptional circumstances, where the loss of tension is due to abnormal or unexpected slack in an unbroken running yarn, where the drop wire may drop sufficiently so that the circuit closes. In the case of temporary loss of tension, it would be desirable that the system automatically reverts to its operating state once the state of loss of tension passes. For this to happen, it is necessary that the system does not shut down automatically upon what may be deemed as temporary circuit closure. This would be possible if there's a method by which such temporary events are identified. Such methods would include monitoring of the circuit closure time using a time monitoring facility provided in the CWM controller—CWM controller being a controlling unit (not shown) that controls the CWM operations. Time from any given closure of circuit is monitored and noted. In the case where there's no opening up of the circuit following from a circuit closure event within a predetermined period, it is indicative of a situation involving a yarn end or other undesirable event that suggests that it would be potentially harmful to allow the CWM to continue operation without intervention. In such a situation, the CWM is made to shut down and a notification is sent to the operator. In the case where there's opening of the circuit within the predetermined period, a notification would be sent to the operator, however, the CWM will be permitted to continue operation.

In this manner, the in-built intelligent module eliminates possibility of any faulty alarm generation for temporary loosening in yarn/tape, and more importantly the consequent shutting down of the CWM. Temporary slack of warp yarn/tape is very common in weaving machines which on account of false alarms consumes significant amount of resources in terms of time and manpower utilization as machine get down for this time period, which is always desirable to avoid under any circumstances.

In summary, it is evident from the foregoing discussion that the invention has the following embodiments.

1. A device for sensing end of warp yarn (1A) or tape on a fabric weaving loom, said device comprises a yarn-end detection means to detect the breakage of or end in said running yarn, and a notification means to notify breakage of or end of yarn, said yarn-end detection means comprising a first element (7) provided with a number of cavities/openings (7E) each of said cavity/opening corresponding to a drop wire (6) that is provided corresponding to each individual yarn, each said drop wire (6) passing through one of said cavity/opening (7E), and said drop wire (6) having a loop or an eye (6A) for passage of said warp yarn (1A), said drop wire (6) being held in its normal operating position due to tension in said running yarn warp (1A), characterized in that:
   said drop wire is provided with a motion restrictor element (6B),
   a second element (8) having holes (8B) is provided, one hole (8B) being provided for each of said drop wires (6), through which corresponding said drop wires (6) pass,
   a first sensing element (7C) is affixed to said first element (7),
   a second sensing element (8A) is affixed to said second element (8), wherein said first element (7) is rotatable at its ends, and wherein, subsequent to the falling of said drop wire (6) from its normal operating position due to substantial loss of tension in said warp yarn (1A), the fall of said drop wire (6) is halted by said motion restrictor element (6B) being obstructed by cavity/opening (7E), whereby said first element (7) rotates to establish a contact between said first and second sensing elements (7C and 8A), and in the case where said contact remains in place for longer than a predetermined period, whereafter a signal is sent to the loom operator indicating malfunction of said loom.

2. The device for sensing end of warp yarn as disclosed in embodiment 1, wherein said motion restrictor element (6B) is ovoid in shape or can be of any shape that enables its downward movement to be halted by the cavity/opening hole (7E).

3. A device for sensing end of warp yarn as disclosed in embodiments 1 or 2, wherein said first sensing element (7C) is affixed to said first element (7) via an extension arm (7D).

4. A device for sensing end of warp yarn as disclosed in any one of embodiments 1 to 3, wherein said motion restrictor element (6B) is in the form of a bend or a kink, or any other shape, in said drop wire (6), said bend/kink/shape being adequate to halt the downward motion of said drop wire.

5. A device for sensing end of warp yarn as disclosed in any one of embodiments 1 to 4, wherein said electric contact between said first and second sensing elements (7C and 8A) is of physical type and enabled by said first and second sensing elements (7C and 8A) being electrically conducting type.

6. A device for sending end of warp yarn as disclosed in any one of embodiments 1 to 4, wherein said contact between said first and second sensing elements (7C and 8A) is of non-physical type enabled by either one of the first and second sensing elements (7C and 8A) being a proximity sensor and the other one being the target and said contact between them establishes when said target enters the triggering region of said proximity sensor.

7. A device for sending end of warp yarn as disclosed in any one of embodiments 1 to 4 and 6, wherein said proximity sensor is of a type selected from a group of types comprising capacitive, capacitive-displacement, Eddy-current, inductive, magnetic, photoelectric, ultrasonic, Hall effect.

8. A device for sensing end of warp yarn as disclosed in any one of embodiments 1 to 7, wherein said predetermined period is monitored using a time monitoring feature integrated in CWM controller.

9. A device for sensing end of warp yarn as disclosed in any one of embodiments 1 to 8, wherein said predetermined period is configurable in CWM controller.

10. A device for sensing end of warp yarn as disclosed in any one of embodiments 1 to 9, wherein said rotatability of said first element is achieved using a rotational mechanism provided at at least one end of said first element.

11. A device for sensing end of warp yarn as disclosed in any one of embodiments 1 to 10, wherein said rotational mechanism is a pin or a ball bearing.

12. A method for sensing end of warp yarn (1A) or tape on a circular weaving loom, characterized in that said method comprises the steps of providing a device as disclosed in any one of embodiments 1 to 11,
detecting a yarn end,
upon substantial loss of elevation of any drop wire (6), establishing a contact between said first and second sensing elements (7C and 8A),
in the case said contact remains in place for said predetermined period, sending a notification signal indicating detection of a yarn end or a yarn break,
stopping the working of said circular weaving loom.

13. The method for sensing end of warp yarn as disclosed in embodiment 12, wherein said motion restrictor element (6B) is ovoid in shape or of any shape that enables its downward movement to be halted by the cavity/opening hole (7E).

14. The method for sensing end of warp yarn as disclosed in any one of embodiments 12 and 13, wherein said first sensing element (7C) is affixed to said first element (7) via an extension arm (7D).

15. The method for sensing end of warp yarn as disclosed in any one of embodiments 12 to 14, wherein said motion restrictor element (6B) is in the form of a bend or a kink, or any other shape in said drop wire (6), said bend/kink/shape being adequate to halt the downward motion of said drop wire (6).

16. The method for sensing end of warp yarn as disclosed in any one of embodiments 12 to 14, wherein said electric contact between said first and second sensing elements (7C and 8A) is of physical type and enabled by said first and second sensing elements (7C and 8A) being electrically conducting type.

17. The method for sensing end of warp yarn as disclosed in any one of embodiments 12 to 15, wherein said contact between said first and second sensing elements (7C and 8A) is of non-physical type enabled by either one of the first and second sensing elements (7C and 8A) being a proximity sensor and the other one being the target and said contact being established when said target enters the triggering region of said proximity sensor.

18. The method for sensing end of warp yarn as disclosed in embodiment 17, wherein said proximity sensor is of a type selected from a group of types comprising capacitive, capacitive-displacement, Eddy-current, inductive, magnetic, photoelectric, ultrasonic, Hall effect.

19. The method for sensing end of warp yarn as disclosed in any one of embodiments 12 to 18, wherein said predetermined period is monitored using a time monitoring feature integrated in CWM controller.

20. The method for sensing end of warp yarn as disclosed in any one of embodiments claims 12 to 19, wherein said predetermined period is configurable in CWM controller.

21. The method for sensing end of warp yarn as disclosed in any one of embodiments 12 to 20, wherein said rotatability of said first element is achieved using a rotational mechanism provided at at least one end of said first element.

22. The method for sensing end of warp yarn as disclosed in embodiment 21, wherein said rotational mechanism is a pin or a ball bearing.

While the above description contains much specificity, these should not be construed as limitation in the scope of the invention, but rather as an exemplification of the preferred embodiments thereof. It must be realized that modifications and variations are possible based on the disclosure given above without departing from the spirit and scope of the invention. Accordingly, the scope of the invention should be determined not by the embodiments illustrated, but by the appended claims and their legal equivalents.

The invention claimed is:

1. A device for sensing a breakage of or an end of a warp yarn on a circular weaving machine (CWM), said device comprising:
   a yarn-end detection means configured to detect the breakage of or the end of said warp yarn, and a notification means to notify a loom operator of the breakage of or the end of the warp yarn, said yarn-end detection means comprising a first element provided with a cavity/opening corresponding to a drop wire that corresponds to the warp yarn, said drop wire passing through said cavity/opening, and said drop wire having a loop or an eye for passage of said warp yarn, said drop wire being held in its normal operating position due to tension in said warp yarn,
   said drop wire including a motion restrictor element;
   a second element having a hole provided for said drop wire, through which said drop wire passes;
   a first sensing element is affixed to said first element;
   a second sensing element is affixed to said second element; and
   wherein said first element is rotatable at its ends, and wherein, subsequent to the falling of said drop wire from its normal operating position due to substantial loss of tension in said warp yarn, the fall of said drop wire is halted by said motion restrictor element being obstructed by the cavity/opening, whereby said first element rotates to establish a contact between said first and second sensing elements, and in the case where said contact remains in place for longer than a predetermined period, a notification signal is sent to the loom operator indicating malfunction of said loom.

2. The device for sensing the end of the warp yarn as claimed in claim 1, wherein said motion restrictor element is ovoid in shape or can be of any shape that enables its downward movement to be halted by the cavity/opening.

3. The device for sensing the end of the warp yarn as claimed in claim 2, wherein said first sensing element is affixed to said first element via an extension arm.

4. The device for sensing the end of the warp yarn as claimed in claim 3, wherein said motion restrictor element is in the form of a bend or a kink, or any other shape, in said drop wire, said bend/kink/shape being adequate to halt the downward motion of said drop wire.

5. The device for sensing the end of the warp yarn as claimed in claim 4, wherein said contact between said first and second sensing elements is of physical type and enabled by said first and second sensing elements being electrically conducting type.

6. The device for sending the end of the warp yarn as claimed in claim 4, wherein said contact between said first and second sensing elements is of non-physical type enabled by either one of the first and second sensing elements being a proximity sensor and the other one being a target and said contact between them establishes when said target enters the triggering region of said proximity sensor.

7. The device for sending the end of the warp yarn as claimed in claim 6, wherein said proximity sensor is of a type selected from a group of types consisting of capacitive, capacitive-displacement, Eddy-current, inductive, magnetic, photoelectric, ultrasonic, and Hall effect.

8. The device for sensing the end of the warp yarn as claimed in claim 7, wherein said predetermined period is monitored using a time monitoring feature integrated in a CWM controller.

9. The device for sensing the end of the warp yarn as claimed in claim 8, wherein said predetermined period is configurable in the CWM controller.

10. The device for sensing the end of the warp yarn as claimed in claim 9, wherein said rotatability of said first element is achieved using a rotational mechanism provided at at least one end of said first element.

11. The device for sensing the end of the warp yarn as claimed in claim 10, wherein said rotational mechanism is a pin or a ball bearing.

12. A method for sensing an end of a warp yarn on a circular weaving machine (CWM), the method comprising:
    providing the device as claimed in claim 1,
    detecting the breakage of or the end of the warp yarn,
    upon substantial loss of elevation of the drop wire, establishing the contact between said first and second sensing elements,
    in the case said contact remains in place for said predetermined period, sending the notification signal indicating detection of the breakage of or the end of the warp yarn,
    stopping the working of said CWM.

13. The method for sensing the end of the warp yarn as claimed in claim 12, wherein said motion restrictor element is ovoid in shape or of any shape that enables its downward movement to be halted by the cavity/opening.

14. The method for sensing the end of the warp yarn as claimed in claim 13, wherein said first sensing element is affixed to said first element via an extension arm.

15. The method for sensing the end of the warp yarn as claimed in claim 14, wherein said motion restrictor element is in the form of a bend or a kink, or any other shape in said drop wire, said bend/kink/shape being adequate to halt the downward motion of said drop wire.

16. The method for sensing the end of the warp yarn as claimed in claim 15, wherein said contact between said first and second sensing elements is of physical type and enabled by said first and second sensing elements being electrically conducting type.

17. The method for sensing the end of the warp yarn as claimed in claim 15, wherein said contact between said first and second sensing elements is of non-physical type enabled by either one of the first and second sensing elements being a proximity sensor and the other one being a target and said contact being established when said target enters the triggering region of said proximity sensor.

18. The method for sensing the end of the warp yarn as claimed in claim 17, wherein said proximity sensor is of a type selected from a group of types consisting of capacitive, capacitive-displacement, Eddy-current, inductive, magnetic, photoelectric, ultrasonic, and Hall effect.

19. The method for sensing the end of the warp yarn as claimed in claim 18, wherein said predetermined period is monitored using a time monitoring feature integrated in a CWM controller.

20. The method for sensing the end of the warp yarn as claimed in claim 19, wherein said predetermined period is configurable in the CWM controller.

21. The method for sensing the end of the warp yarn as claimed in claim 20, wherein said rotatability of said first element is achieved using a rotational mechanism provided at at least one end of said first element.

22. The method for sensing the end of the warp yarn as claimed in claim 21, wherein said rotational mechanism is a pin or a ball bearing.

* * * * *